Aug. 6, 1929.          F. McLAUGHLIN          1,723,193
                         FISHING BAIT
                      Filed Nov. 28, 1927
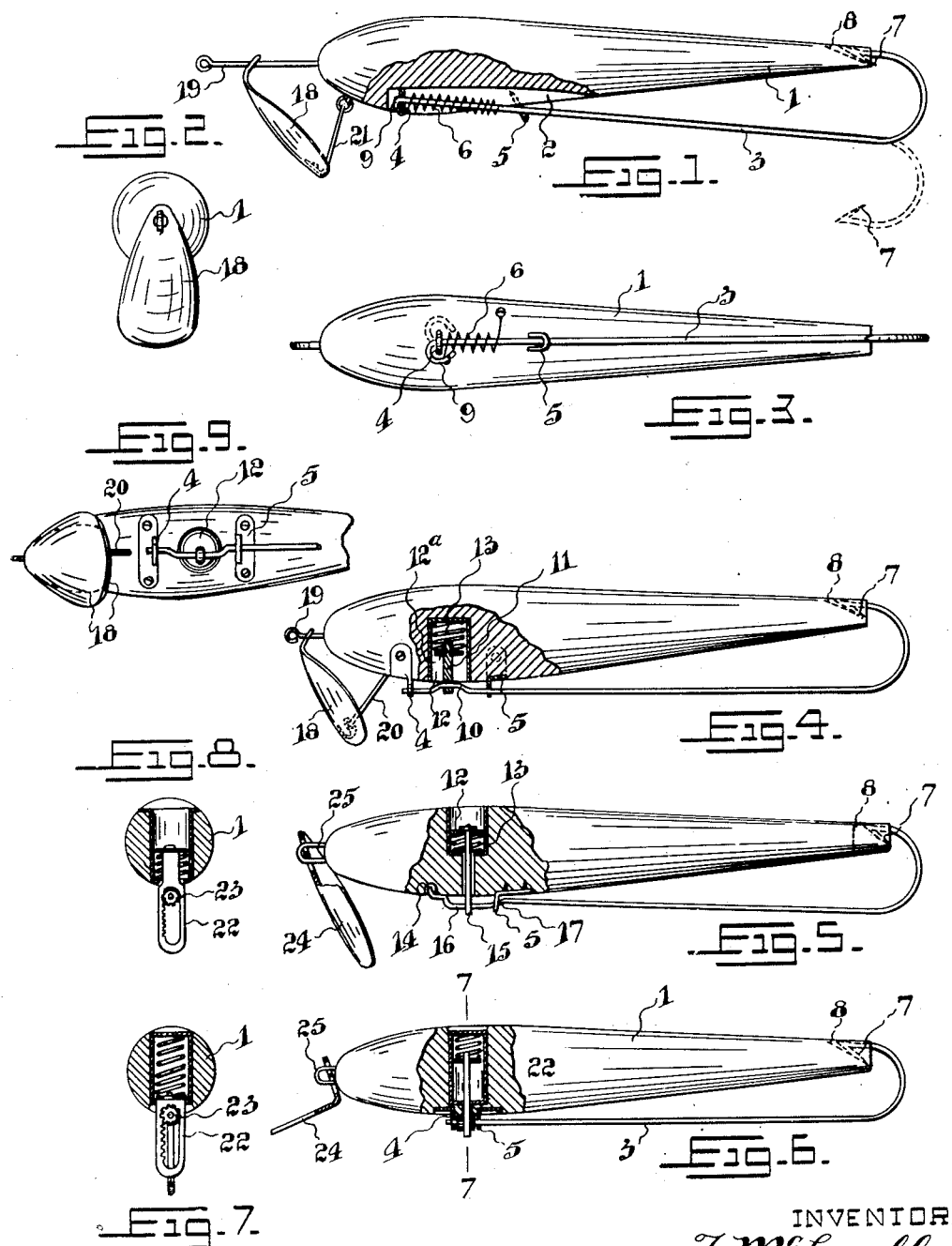
INVENTOR.
F. McLaughlin
BY J. Edward Maybee
ATTY.

Patented Aug. 6, 1929.

1,723,193

UNITED STATES PATENT OFFICE.

FRANK McLAUGHLIN, OF TORONTO, ONTARIO, CANADA, ASSIGNOR TO MARION FREDENBERG, OF TORONTO, CANADA.

FISHING BAIT.

Application filed November 26, 1927. Serial No. 237,938.

This invention relates to artificial baits or lures used in fishing. With baits as heretofore constructed it has been very difficult to fish in weed infested waters on account of not being able to keep the bait clear of weeds.

My chief object therefore is to devise a bait or lure which may be used in weed infested waters with little danger of it becoming entangled with the weeds.

It has been known in baits to provide means for causing the bait to move from side to side or wobble in imitation of a fish swimming, but the imitations have not been very satisfactory, and a further object therefore of my invention is to devise for giving the bait a more life like motion when pulled through the water.

I attain my objects by mounting on the body of the bait, preferably on its underside, a hook with the shank thereof extending longitudinally of the body, which hook is adapted to be rotated so that its barbed end may occupy a position with its barb concealed in a recess in the tail end of the body or a position spaced from the body, and providing means for giving the hook shank the necessary rotary movement.

At the front of the body I mount a spoon or wobbler which is adapted to swing from side to side of the body.

The bait is constructed in detail substantially as hereinafter described and illustrated in the accompanying drawings in which Fig. 1 is a side elevation, partly broken away, of one form of bait with the hook shown in full lines in the normal position when being pulled through the water, and in dotted lines in the position it assumes when caught by a fish;

Fig. 2 a front view of the bait;

Fig. 3 a plan view of the underside of a bait showing another method of mounting the hook on the body;

Fig. 4 a view similar to Fig. 1 showing a further modification;

Figs. 5 and 6 views similar to Fig. 1 showing still further modifications;

Fig. 7 a cross section on the line 7—7 in Fig. 6;

Fig. 8 a cross section similar to Fig. 7, but showing a further variation; and

Fig. 9 a detail plan view of part of the undeside of the bait shown in Fig. 4.

In the drawings like numerals of reference indicate corresponding parts in the different figures.

1 is the body, which may be made of wood, metal or other material and given any desired finish. The body is formed with a groove 2 in its underside to receive the end of the shank 3 of the hook. The shank is rotatably mounted in spaced bearing members 4 and 5. On the shank between the bearing members is mounted a coil spring 6, one end of which is secured to the shank and the other end to the forward bearing member 4. The shank rearward of the bearing member 5 extends gradually away from the body, and its hook is curved towards the body, the barbed end 7 being normally positioned in a notch 8 formed in the rear end of the body.

The spring 6, when the barbed end of the hook is positioned in the notch 8, is under tension, and therefore when the barbed end is disengaged from the notch the hook will be rotated to the position shown in dotted lines in Fig. 1. The disengagement of the hook with the notch 8 may be provided for in different ways. In the form shown in Fig. 1, sufficient play is left in the bearing 5 to give the hook the necessary movement. This play is not absolutely necessary, as the same result may be obtained by forming the shank of spring metal.

To limit the rotation of the hook, the head of the shank is provided with an integral stop 9 adapted to engage the body.

In Fig. 3 a slightly modified arrangement of the spring 6 is shown, one end of the spring being connected to the integral stop 9, and the other end to the body.

In Figs. 4 and 9 the shank 3 is formed with an offset portion 10 which is connected by a spring-actuated plunger 11 movable in a recess 12ª formed in the body 1. The stem of the plunger is rockable relative to the head, the latter being formed as a washer 12, one end of the spring 13 engaging the washer and the other end the bottom of the recess. In this case, when the barbed end of the hook is in the notch 8, the offset portion will be slightly off dead centre so that the spring will be free to come into operation.

In the construction shown in Fig. 5, one end of the shank is engaged in a hole 14 formed in the body, and a spring-actuated plunger 15 provides the bearing for the forward part of the shank. The shank is offset at 16 outwardly and slightly to one side relative to the plane of the hook. It will be noted that when the hook is in the position as shown in full lines, the bearing member 5 engages with the inclined portion 17 at the end of the offset portion. Thus when the hook is rocked to disengage the end of its shank from the hole 14, the shank is caused to rotate.

In the form shown in Figs. 6 and 7 for rotating the hook I provide a spring actuated plunger 22 formed as a rack and on the shank of the hook is provided a pinion 23 with which the rack engages. In this case the plunger is normally retracted and on the release of the hook, the spring forces the plunger to extended position.

In Fig. 8 I show a slight variation of the form shown in Figs. 6 and 7 in that the plunger is normally extended and is retracted on the release of the hook. This arrangement, however, is not so desirable on account of the greater danger of picking up weeds.

Fish in grabbing the bait usually tackles from behind and the fish in biting will actuate the hook to disengage the barbed end from the recess in the end of the bait and the spring will then come into action to rotate the shank to hook the fish.

For the purpose of causing a sidewise or wobbling motion of the bait as it is drawn through the water, I position at the front of the bait a wobbler 18. One end of the wobbler is pivotally connected to the bait near the mouth, while the other end is pivotally connected with the underside of the bait a short distance back from the mouth. The pivotal connections of the wobbler with the bait may be arranged in numerous ways, the important feature, however, in each form being that the wobbler must not be able to make a complete rotation. In other words, to secure satisfactory results the wobbler must oscillate. Another important point to be borne in mind is that the connections must be arranged to afford a minimum danger of picking up weeds.

In Fig. 4 the forward end of the wobbler is pivoted on the eye 19 projecting from the forward end of the body to which the line is secured and the rearward end is connected with a pin 20 projecting downwardly and forwardly from the underside of the body.

In the form shown in Fig. 1 the rearward end of the wobbler is provided with an upwardly directed extension 21 which is connected with an eye on the underside of the body.

In Fig. 5 a still further arrangement of wobbler is shown. The wobbler 24 is provided with two spaced holes through which a staple 25 driven in the head is passed. The holes are sufficiently large to enable the wobbler to swing or rock from side to side as the bait travels through the water, and under the action of the water the wobbler will be forced back to the position shown in this figure.

In all the forms of wobbler above described, the body is directed downwardly and rearwardly and is of concavo-convex form or spoon-shaped in cross section. While this arrangement is preferable from the standpoint of a weedless bait, it is not absolutely necessary, as far as obtaining the wobbling effect is concerned, as good results may be obtained by directing the wobbler forwardly as shown in Fig. 6. In this case the main part of the wobbler is flat but it may be bent into other shapes.

Another advantage of the wobbling device, particularly in connection with the forms of my invention in which the bearing members and actuating means for the hook project below the underside of the body, is that it acts as a shield to deflect any weeds which might otherwise catch on these projecting parts.

What I claim is:

1. In a fishing bait, the combination of a body; a hook having its shank rotatably mounted on the body; and means tending to rotate the hook, the hook adjacent the point being adapted to be releasably engaged with the body to hold said shank from rotation.

2. In a fishing bait, the combination of a body; a hook having its shank rotatably mounted on the body and extending substantially longitudinally thereof; and means tending to rotate the hook, the hook adjacent the point being adapted to be releasably engaged with the body to hold said shank from rotation.

3. In a fishing bait, the combination of a body; a hook having its shank rotatably mounted on the body; and spring means tending to rotate the hook, the hook adjacent the point being adapted to be releasably engaged with the body to hold said shank from rotation.

4. In a fishing bait, the combination of a body; a hook having its shank rotatably mounted on the body; and means tending to rotate the hook, the point of the hook being adapted to be engaged with the body to hold said shank from rotation, the shank being adapted to be rocked longitudinally to disengage the point from the body.

5. In a fishing bait, the combination of a body; a hook having its shank rotatably mounted on the body and rockable longitudinally relative thereto; and spring means tending to rotate the hook, the hook adjacent the point being adapted to be frictionally engaged with the body and held there under normal conditions by the action of said spring means.

6. In a fishing bait, the combination of a body; a hook having its shank rotatably mounted on the body and rockable longitudinally relative thereto and extending substantially longitudinally thereof, said body having a notch formed therein adjacent its rear end; and spring means tending to rotate the hook, the hook adjacent the point being adapted to be frictionally engaged with the body and held in said notch under normal conditions by the action of said spring means.

7. In a fishing bait, the combination of a body; a pair of bearing members spaced longitudinally of the body; a hook having its shank journalled in said bearing members; and a spring on said shank having one end connected with the shank and its other end connected with the body and tending to rotate the shank, the point of said hook being adapted to be detachably engaged with the body to hold the said spring out of action.

8. In a fishing bait, the combination of a body; a hook having its shank rotatably mounted on the body; means tending to rotate the hook, the hook adjacent the point being adapted to be releasably engaged with the body to hold said shank from rotation; and a stop on said shank tending to limit the rotation of the hook.

9. In a fishing bait, the combination of a body; having a longitudinal groove therein; a pair of bearing members in said groove spaced longitudinally of the body; a hook having its shank journalled in said bearing members; and a spring on said shank having one end connected with the shank and its other end connected with the body and tending to rotate the shank, the point of said hook being adapted to be detachably engaged with the body to hold the said spring out of action.

10. In a fishing bait, the combination of a body; a hook carried by the body; means pivotally connected at the forward end of the body for causing the body to wobble when drawn through the water; and means for limiting the movement of the said means to less than a complete revolution.

11. In a fishing bait, the combination of a body; a hook carried by the body; a swinging wobbler extending rearwardly and downwardly from the forward end of the body; and means for limiting the movement of said wobbler to less than a complete revolution.

12. In a fishing bait, the combination of a body; a hook carried by the body; a pin extending forwardly from the body; a wobbler having its forward end pivotally connected with said pin and extending downwardly and rearwardly; and a pivotal connection between the rear end of said wobbler and the body.

13. In a fishing bait, the combination of a body; a hook carried by the body; a pin extending forwardly from the body; a wobbler having its forward end pivotally connected with said pin and extending downwardly and rearwardly; and a pivotal connection between the rear end of said wobbler and the body, said wobbler being positioned to engage the body to limit its movement from side to side.

14. In a fishing bait, the combination of a body; a hook having its shank rotatably mounted on the body; means tending to rotate the hook, the hook adjacent the point being adapted to be releasably engaged with the body to hold said shank from rotation; means pivotally connected at the forward end of the body for causing the body to wobble when drawn through the water; and means for limiting the movement of the said means to less than a complete revolution.

15. In a fishing bait, the combination of a body; a hook having its shank rotatably mounted on the body; means tending to rotate the hook, the hook adjacent the point being adapted to be releasably engaged with the body to hold said shank from rotation; a swinging wobbler extending rearwardly and downwardly from the forward end of the body; and means for limiting the movement of said wobbler to less than a complete revolution.

16. In a fishing bait, the combination of a body; a hook having its shank rotatably mounted on the body whereby the point of the hook may occupy a position shielded by the body or a position spaced from the body; and means normally adapted to retain the hook with its point in the shielded position, the hook and body being adapted to be relatively displaced to release the hook for rotation.

Signed at Toronto, Can., this 21st day of November, 1927.

FRANK McLAUGHLIN.